US009346087B2

(12) United States Patent
Forrester

(10) Patent No.: US 9,346,087 B2
(45) Date of Patent: May 24, 2016

(54) NON-EMBEDDING METHOD FOR HEAVY METAL STABILIZATION USING BEEF BONE MEAL AND BLAST MEDIA

(71) Applicant: Keith E. Forrester, Meredith, NH (US)

(72) Inventor: Keith E. Forrester, Meredith, NH (US)

(*) Notice: Subject to any disclaimer, the term of this patent is extended or adjusted under 35 U.S.C. 154(b) by 0 days.

(21) Appl. No.: 14/574,213

(22) Filed: Dec. 17, 2014

(65) Prior Publication Data

US 2015/0105000 A1    Apr. 16, 2015

Related U.S. Application Data

(63) Continuation of application No. 13/951,126, filed on Jul. 25, 2013, now abandoned.

(60) Provisional application No. 61/741,648, filed on Jul. 25, 2012.

(51) Int. Cl.
*A62D 3/30* (2007.01)
*B09B 3/00* (2006.01)
*B24C 11/00* (2006.01)

(52) U.S. Cl.
CPC ............... *B09B 3/0033* (2013.01); *A62D 3/30* (2013.01); *B09B 3/0025* (2013.01); *B24C 11/005* (2013.01)

(58) Field of Classification Search
CPC .............................. A62D 2101/43; A62D 3/30
See application file for complete search history.

(56) References Cited

U.S. PATENT DOCUMENTS

| 4,652,381 A | 3/1987 | Inglis |
| 4,889,640 A | 12/1989 | Stanforth |
| 4,955,519 A | 9/1990 | Forrester |
| 5,037,479 A | 8/1991 | Stanforth |
| 5,040,920 A | 8/1991 | Forrester |
| 5,202,033 A | 4/1993 | Stanforth et al. |
| 5,245,114 A | 9/1993 | Forrester |
| 5,430,233 A | 7/1995 | Forrester |
| 5,536,899 A | 7/1996 | Forrester |
| 5,637,355 A | 6/1997 | Stanforth et al. |
| 5,667,696 A | 9/1997 | Studer et al. |
| 5,674,108 A | 10/1997 | Rolle |
| 5,722,928 A | 3/1998 | Forrester |
| 5,827,574 A | 10/1998 | Stanforth |
| 5,846,178 A | 12/1998 | Forrester |
| 5,860,908 A | 1/1999 | Forrester |
| 5,902,392 A | 5/1999 | Henkelman |
| 6,001,185 A | 12/1999 | Huff |
| 6,050,929 A | 4/2000 | Forrester |
| 6,089,955 A | 7/2000 | Rolle |
| 6,186,939 B1 | 2/2001 | Forrester |
| 6,471,751 B1 | 10/2002 | Semanderes |
| 6,515,053 B1 | 2/2003 | Forrester |
| 6,688,811 B2 | 2/2004 | Forrester |
| 7,121,995 B2 | 10/2006 | Forrester |
| 7,314,512 B2 | 1/2008 | Barthel et al. |
| 7,530,939 B2 | 5/2009 | Forrester |
| 7,736,291 B2 | 6/2010 | Forrester |
| 8,037,479 B2 | 10/2011 | Hambrick et al. |
| 8,796,501 B2 * | 8/2014 | Forrester ................. A62D 3/33 588/315 |
| 2003/0143031 A1 | 7/2003 | Forrester |
| 2004/0006253 A1 | 1/2004 | Forrester |
| 2004/0015036 A1 | 1/2004 | Forrester |
| 2004/0018130 A1 | 1/2004 | Forrester |
| 2004/0024281 A1 | 2/2004 | Forrester |
| 2004/0024283 A1 | 2/2004 | Forrester |
| 2004/0034267 A1 | 2/2004 | Forrester |
| 2004/0068156 A1 | 4/2004 | Forrester |
| 2004/0091549 A1 | 5/2004 | Forrester |
| 2004/0116766 A1 | 6/2004 | Forrester |
| 2005/0049449 A1 | 3/2005 | Forrester |
| 2005/0209496 A1 | 9/2005 | Forrester |
| 2005/0209497 A1 | 9/2005 | Forrester |
| 2005/0215841 A1 | 9/2005 | Forrester |
| 2005/0245783 A1 | 11/2005 | Forrester |
| 2006/0036124 A1 | 2/2006 | Forrester |
| 2006/0047177 A1 * | 3/2006 | Forrester ................. A62D 3/33 588/256 |

(Continued)

FOREIGN PATENT DOCUMENTS

| WO | WO 98/24938 A1 | 6/1998 |
| WO | WO 98/57710 A1 | 12/1998 |
| WO | WO 2015/013267 | 1/2015 |

OTHER PUBLICATIONS

T. Maruyama, et al. "Effects of Blasting Parameters on Removability of Residual Grit" Building on 100 Years of Success, Proceedings of the 2006 International Thermal Spray Conference (Seattle, WA), May 15-18, 2006.*
Abstract of "Effect of blast cleaning parameters on corrosion of brass parts" dated 2005. printed from http://www.emeraldinsight.com/doi/abs/10.1108/15736101211281524 on Sep. 11, 2014.*
NaturVet & GreenTree NaturVet Steamed Bone Meal Powder (1 lb), printed from www.archive.org on Dec. 14, 2015, original publication prior to Sep. 17, 2009, https://web.archive.org/web/20090917181932/http://www.healthypets.com/nastbomepo11.html.*
Federal Register, "Hazardous Waste Management System; Identification and Listing of Hazardous Waste; Toxicity Characteristic Revisions" vol. 55, No. 126, pp. 26986-26998 (Jun. 29, 1990).

(Continued)

*Primary Examiner* — John Kreck
(74) *Attorney, Agent, or Firm* — Hamilton, Brook, Smith & Reynolds, P.C.

(57) ABSTRACT

Methods are disclosed for stabilizing a heavy metal in a heavy metal bearing paint residue to reduce leaching of the heavy metal from a waste subject to natural or induced leaching conditions by addition of environmentally safe, worker safe, and multi-media compatible stabilizing agent comprising beef bone meal. Beef bone meal is added to the blast media, and provides effective reduction of heavy metal content in waste leachate and effectively removes paint residue without causing visible embedding on the substrate surface, which meets the SSPC SP10 criteria for surface preparation prior to painting. The methods described herein may be used outside of or within an OSHA containment building or collection device. The resultant stabilized paint residue and spent blast media mixture is suitable for on-site reuse, off-site reuse, or disposal as RCRA non-hazardous waste.

21 Claims, 3 Drawing Sheets

(56) References Cited

U.S. PATENT DOCUMENTS

| | | |
|---|---|---|
| 2006/0116545 A1 | 6/2006 | Forrester |
| 2006/0178548 A1 | 8/2006 | Forrester |
| 2006/0183957 A1 | 8/2006 | Forrester |
| 2006/0189837 A1 | 8/2006 | Forrester |
| 2006/0217585 A1 | 9/2006 | Forrester |
| 2006/0229485 A1 | 10/2006 | Forrester |
| 2007/0010701 A1 | 1/2007 | Forrester |
| 2007/0213577 A1 | 9/2007 | Forrester |
| 2007/0225541 A1 | 9/2007 | Forrester |
| 2007/0267343 A1 | 11/2007 | Forrester |
| 2007/0287877 A1 | 12/2007 | Forrester |
| 2008/0086022 A1 | 4/2008 | Forrester |
| 2008/0125616 A1 | 5/2008 | Forrester |
| 2008/0139868 A1 | 6/2008 | Forrester |
| 2008/0207980 A1 | 8/2008 | Forrester |
| 2009/0047362 A1 | 2/2009 | Forrester |
| 2009/0093667 A1 | 4/2009 | Forrester |
| 2009/0209800 A1 | 8/2009 | Forrester |
| 2011/0116872 A1 | 5/2011 | Cunigan |
| 2012/0215048 A1 | 8/2012 | Forrester |
| 2012/0220810 A1 | 8/2012 | Forrester |
| 2013/0060076 A1 | 3/2013 | Forrester |
| 2013/0098269 A1 | 4/2013 | Forrester |

OTHER PUBLICATIONS

Notification of Transmittal of The International Search Report and the Written Opinion of the International Searching Authority, or the Declaration for International Application No. PCT/US2014/047606, "Non-Embedding Method for Heavy Metal Stabilization Using Beef Bone Meal and Blast Media", Date of Mailing: Nov. 7, 2014.

Maruyama, T., et al., "Effects of Blasting Parameters on Removability of Residual Grit Building on 100 Years of Success," *Proceedings of the 2006 International Thermal Spray Conference* (Seattle, WA), May 15-18, 2006.

Abstract of "Effect of Blast Cleaning Parameters on Corrosion of Brass Parts," dated 2005. printed from http://www.emeraldinsigh.com/doi/abs/10.1108/15736101211281524; on Sep. 11, 2014.

* cited by examiner

NON-EMBEDDING METHOD FOR HEAVY METAL STABILIZATION USING BEEF BONE MEAL AND BLAST MEDIA

RELATED APPLICATIONS

This application is a continuation of U.S. application Ser. No. 13/951,126, filed Jul. 25, 2013, which claims the benefit of U.S. Provisional Application No. 61/741,648, filed on Jul. 25, 2012. The entire teachings of the above applications are incorporated herein by reference.

BACKGROUND OF THE INVENTION

Heavy metal bearing paint residue, and mixtures of heavy metal bearing paint residue and spent paint removal blasting or abrasive media, may be deemed "Hazardous Waste" by the United States Environmental Protection Agency (USEPA) pursuant to 40 C.F.R. Part 261 and also deemed hazardous under similar regulations in other countries such as Japan, Switzerland, Germany, United Kingdom, Mexico, Australia, Canada, Taiwan, European Countries, India, and China, and deemed special waste within specific regions or states within those countries, if containing hazardous waste regulatory method extraction fluid solution-soluble and/or sub-micron filter-passing particle sized heavy metals such as; Arsenic (As), Silver (Ag), Barium (Ba), Lead (Pb), Cadmium (Cd), Chromium (Cr), Mercury (Hg), Selenium (Se), Copper (Cu), Zinc (Zn), and Antimony (Sb), above levels deemed hazardous by those country, regional and/or state regulators.

There exists a need for methods that reduce the solubility of mixed heavy metal bearing paint residue and spent blast media, such that the extract from these mixtures contains minimal concentrations of heavy metals that fall within limits deemed allowable by the U.S. and other countries, enabling such mixtures to be classified as non-hazardous waste.

The prior art has focused on reducing solubility of heavy metals, mostly lead, from paint residues by application of phosphate sources blended with Latex and silicates onto surfaces prior to blasting (Forrester U.S. Pat. No. 6,515,053 B1), application of certain acidulated calcium phosphates such as triple superphosphate and diammonium phosphate blended with blast media used for painted surface removal by air blasting (Forrester U.S. Pat. No. 6,186,939 B1), and post-paint removal blasting application of known heavy metal stabilizers such as phosphates, carbonates, cement, silicates, with or without mineral complexers, in accumulation tanks or waste piles after collection or accumulation of the paint residue (Forrester U.S. Pat. No. 5,846,178, Forrester U.S. Pat. No. 5,722,928 and Forrester U.S. Pat. No. 5,536,899 and references cited therein).

Several other methods have been investigated to decrease the amount of heavy metal in industrial wastes. U.S. Pat. No. 5,202,033 describes an in-situ method for decreasing Pb Toxicity Characteristic Leaching Procedure (TCLP) leaching from solid waste using a combination of solid waste additives and additional pH controlling agents from the source of phosphate, carbonate, and sulfates. U.S. Pat. No. 5,037,479 discloses a method for treating highly hazardous waste containing unacceptable levels of TCLP Pb such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron. U.S. Pat. No. 4,889,640 discloses a method and mixture from treating TCLP hazardous lead by mixing the solid waste with an agent selected from the group consisting of reactive calcium carbonate, reactive magnesium carbonate and reactive calcium magnesium carbonate. U.S. Pat. No. 4,652,381 discloses a process for treating industrial wastewater contaminated with battery plant waste, such as sulfuric acid and heavy metals by treating the waste waster with calcium carbonate, calcium sulfate, calcium hydroxide to complete a separation of the heavy metals. Recently, calcium phosphates have been investigated (Forrester US 2012/0220810).

SUMMARY OF THE INVENTION

The present invention relates to methods for stabilizing a heavy metal in a heavy metal-containing paint residue to reduce leaching of the heavy metal when the paint residue is generated into paint waste and exposed to natural or induced leaching conditions. The method comprises contacting a heavy metal-containing paint residue that is painted on a substrate with a mixture comprising paint removal blast media and a stabilizing agent comprising beef bone meal in an amount effective to reduce leaching of the heavy metal to a non-hazardous level, thereby forming a stabilized paint waste and a blast-cleaned substrate. In the methods of the current invention, the blast-cleaned substrate is not visibly embedded with stabilizing agent or paint removal blast media.

In some aspects of the invention, the methods described herein are used in an OSHA containment structure, or alternately in a collection device, wherein the beef bone meal contacts the paint residue before, during or after exposure of the paint residue to an exhaust air filtration system.

The methods of the present invention may be utilized with all blast removal techniques, including pressurized pot blasting or venturi-type pickup. In some aspects of the invention, the beef bone meal stabilizing agent is exposed to the paint residue as a mixture with blast media, which comprises dry blasting media, semi-wet sponge blasting media, or high pressure water. Dry blasting media used in the invention is dry powder, dry granule, or alternately a slurried mixture.

The methods of the present invention generate a stabilized paint waste, which in some embodiments of the invention, comprises heavy metal containing solid phase mineral, for example $Pb_3(PO_4)_2$, exhibiting low toxicity and low solubility under natural or induced leaching conditions. The solid phase mineral meets the criteria for resistance to leaching under Toxicity Characteristic Leaching Procedure (TCLP), Synthetic Precipitation Leaching Procedure (SPLP), California Waste Extraction Test (CALWET), Multiple Extraction Procedure (MEP) and other protocols.

In some aspects of the invention, the resultant blast-cleaned substrate is compatible with subsequent application or paint surface cleaners, primers and paints.

The preferred stabilizer for lead bearing paint and spent media is 16 to 200 US Sieve and preferably 30 to 100 US Sieve sized steamed beef bone meal. In some aspects of the invention, the beef bone meal may be mixed with an additive, wherein the additive comprises up to 50% by weight of the beef bone meal and additive blend. The additive comprises fish bone meal, pork bone meal, crushed and milled phosphate rock ore, calcium phosphate sources such as single superphosphate, triple superphosphate, dicalcium phosphate, dicalcium phosphate dihydrate powder, monocalcium phosphate, and tricalcium phosphate for substitution of Pb into calcium phosphate apatite minerals, provided that the additive combined with the beef bone meal does not cause any visual embedding into the substrate to be blast-cleaned. In alternate embodiments of the invention, the beef bone meal may be mixed with an additive to create a blend, wherein the additive comprises up to 50% by weight of the blend, for projects in which the Society for Protective Coatings (SSPC) standard of non-embedment is not established as a project criterion.

In an alternate embodiment of the invention, the methods herein relate to stabilizing a heavy-metal containing paint residue by contacting a mixture of the paint residue and blast media with beef bone meal in an amount effective to reduce leaching of the heavy metal to a non-hazardous level.

BRIEF DESCRIPTION OF THE DRAWINGS

The foregoing will be apparent from the following more particular description of example embodiments of the invention, as illustrated in the accompanying drawings.

DEFINITIONS

Figure 1:
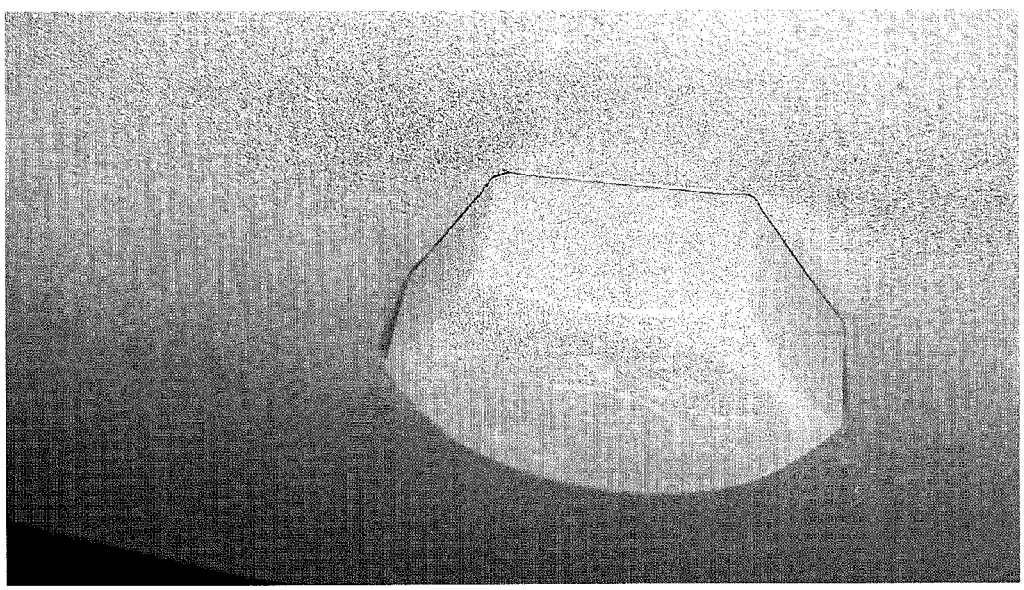
FIG. 1 is a photograph of a bolt at the Queets River Bridge blasting project. After removal of paint utilizing Green Diamond Sand Product blast media and beef bone meal as described in the present invention, no visible embedding was observed.

As used herein, a "heavy metal-containing paint residue" is a residue, optionally in chip, powder, flake or coating form that contains one or more heavy metals such as arsenic, silver, barium, lead, cadmium, chromium, mercury, selenium, copper, zinc, antimony in any oxidation state, including zero (e.g., Ag(0)).

"Induced leaching conditions" as used herein, means conditions such as moisture content, pH, and temperature that mimic natural leaching conditions such as rain or acid rain observed in the environment or observed in a real setting like a landfill. Induced leaching conditions can be those implemented by country regulations, such as but not limited to Toxicity Characteristic Leaching Procedure (TCLP), Synthetic Precipitation Leaching Procedure (SPLP), California Waste Extraction Test (CALWET), Multiple Extraction Procedure (MEP) and the like.

The term "stabilizing", as in "stabilizing a heavy metal", means converting the heavy metal into an insoluble mineral form. An effect of stabilizing or stabilization of a heavy metal is that the amount of heavy metal that leaches into an environment during natural or induced leaching conditions is lowered. "Reduction of leaching", or "reduced leaching" or "reducing leaching" and the like refer to decreasing the concentration or the overall molar or mass quantities of a heavy metal that is released into the environment during natural or induced leaching conditions.

As used herein, "paint waste" is paint residue intended for disposal. Paint waste can be generated from a paint removal method like blasting, or it can be a supply remaining from a painting project, or it can include flakes or chips that have come off of a substrate naturally without a paint removal method. Paint waste can comprise a variety of components, including pigments, sealants, polymers and heavy metals. A "stabilized paint waste" is a paint waste in which the heavy metals have been converted to an insoluble mineral form, optionally through contact with a stabilizing agent.

"Spent paint removal blast media" includes blast media that has been used in a paint removal process. Optionally, spent paint removal blast media comprises paint waste.

"Dusting" as used herein, refers to methods that generate small particulate matter visible to the naked eye in the course of blast cleaning a substrate. Non-dusting methods generate no visible amount of particulate emission from a point or line source.

A "non-hazardous level" means a level, for example, a concentration level of a heavy metal, which is classified as non-hazardous or alternately non-toxic by a specific protocol as set forth by a law-making body. As described herein, different countries maintain different standards for non-hazardous waste, and also implement different tests to measure hazardous or toxic content. As used herein, a "non-hazardous level" refers to the standards defined by the laws of countries including, but not limited to The United States, Canada, Mexico, Taiwan, China, Thailand, Japan, Hong Kong, Philippines, Australia, New Zealand, India, Brazil, the countries of Central and South America and the countries of the European Union.

"pH neutral" as used herein, refers to a material having a pH that is neither acidic nor basic, and is about 7.0.

The term "water insoluble" means a material having little to no solubility in water; for example having no solubility below 5 grams of compound per 100 mL of deionized water at standard temperature and pressure (STP), wherein STP is 0.986 atm and 25° C.

The term "grind suitable" means a phosphate or another composition that can be ground with conventional grinding devices such as hammer mill or gear mill.

The terms "low settling" or alternately "low sifting" are characteristics of a composition that has little amount of compound that settles to the bottom of a bag or container during transport. Therefore, a composition that is "low settling" or "low sifting" remains relatively uniform in concentration relative to the depth of a container when placed into a blasting pot or container.

DETAILED DESCRIPTION OF THE INVENTION

A description of example embodiments of the invention follows.

The present invention discloses a heavy metal bearing mixed paint residue and spent paint removal media regulatory test extract heavy metal content solubility reduction method by contact of heavy metal bearing paint with a pre-blend of blast removal media and heavy metal stabilizers, where the pre-blend mixture is engineered for optimal performance for a given paint removal project. The stabilizers are specifically engineered and improved over existing pre-blended stabilizers and blast media, given that this new pre-blended media and stabilizer method uses only environmental-safe, worker-safe, non-toxic, substrate compatible, and multi-media compatible stabilizers, suitable for blending with dry blasting media, semi-wet sponge blast media, and high pressure water paint blast systems. It has been observed by the inventor that current heavy metal control and abatement systems used worldwide at paint removal projects are not capable of collecting 100% of the newly generated stabilizer and paint blend, and thus the existing technologies are lacking in production of environmental and worker exposure safe resultant minerals and molecules that are also capable of being used with the dry and wet abrasive removal techniques used by paint removal and collection contractors.

The present invention relates to methods for stabilizing a heavy metal in a heavy metal-containing paint residue to reduce leaching of heavy metals from paint waste, comprising contacting a paint residue on a substrate with a mixture of blast media and stabilization agent, thereby forming stabilized paint waste and a blast-cleaned substrate. The stabilizing agent used in the present invention comprises beef bone meal and is non-dusting and adhere to the Society for Protective Coatings (SSPC) industry standard of zero visual embedding in the substrate. In alternate embodiments of the invention, the methods described herein stabilize a heavy metal in a mixture of heavy metal-containing paint residue and spent paint removal blast media by contacting the mixed media with a stabilization agent comprising beef bone meal.

Previously invented methods failed to recognize the importance of applying a blended mixture of paint removal media and paint residue stabilizer with or without mineral complexing agents that are (1) engineered to be safe to the environment and biological communities either outside of or inside the painted structure OSHA containment building, safe to workers with regard to inhalation, ingestion, and dermal contact, non-toxic, and compatible with painted surface substrate, (2) multi-media compatible and thus suitable for blending with dry blasting media, semi-wet sponge blast media, and high pressure water paint blast systems, (3) of a certain density and physical geometry that allows for pre-blending with common blast media such as Coarse Black Beauty Blast Media or Green Diamond Sand Products, mining waste and mining tailings, such that the pre-blend of stabilizer with blast media remains uniform and non-separated from production to packaging, to shipment, and finally to delivery, (4) not cause embedding or residual adhesion of stabilizer onto the steel substrate lead painted surface, (5) form minimal dust during blasting from the stabilizer and media combination pre-blend, and (6) have low to no physical cementing characteristic. This last characteristic is a significant problem with the currently commercially available Blastox product (The TDJ Group, Inc.). Blastox has a lime and silicate water hydroscopic and cementing nature if wetted and/or allowed to attract moisture during storage and use of the pre-blend and post use collection and storage prior to disposal. Further, Blastox and other current blasting techniques used to remove paint residue suffer from the disadvantage that their fine small particulate lime and silicate particles cause visible dust and adhere to steel surfaces on blasting. This leaves small amounts of particles on the surface of the substrate after blast cleaning Blast media and stabilizing agents used to sequester heavy metals also become visibly embedded in the substrate from which paint is removed. The Society for Protective Coatings (SSPC) has implemented a standard whereby the substrate must be free of naked eye observable surface particles of stabilizer or paint prior to priming or painting a substrate.

There is a need in the art for a method to concurrently remove heavy metal-containing paint from substrates while stabilizing the heavy-metal containing paint residue spent blast paint removal media. Further, such a method must operate without causing visual embedding of a stabilizing agent or blast media into the substrate from which paint is being removed. The methods of the present invention presented herein address and overcome these previous limitations and disadvantages in blasting technologies.

The present invention provides a method of reducing the solubility of mixed heavy metal bearing paint residue and spent blast media. Paint residue heavy metal solubility is controlled by the invention as measured under Toxicity Characteristic Leaching Procedure (TCLP), Synthetic Precipitation Leaching Procedure (SPLP; EPA Method 1312), California Waste Extraction Test (CALWET), Multiple Extraction procedure (MEP), rainwater and surface water leaching conditions, as well as under regulatory water extraction test conditions as defined by waste control regulations in China, Thailand, Taiwan, Japan, Canada, UK, Mexico, Switzerland, Germany, Sweden, The Netherlands and under American Nuclear Standards for sequential leaching of wastes by de-ionized water.

In the United States, any solid waste can be defined as Hazardous Waste either because it is listed in 40 C.F.R., Part 261 Subpart D, federal regulations adopted pursuant to the Resource Conservation and Recovery Act (RCRA), or because it exhibits one or more of the characteristics of a Hazardous Waste as defined in 40 C.F.R. Part 261, Subpart C. The hazard characteristics defined under 40 C.F.R. Part 261 are: (1) ignitability, (2) corrosivity, (3) reactivity, and (4) toxicity as tested under the Toxicity Characteristic Leaching Procedure (TCLP). 40 C.F.R., Part 261.24(a), contains a list of heavy metals and their associated maximum allowable concentrations, as measured under the USEPA Method 1311 leach test, TCLP. If a heavy metal, such as lead, exceeds its maximum allowable concentration of extract leaching from a solid waste, when tested using the TCLP analysis as specified at 40 C.F.R. Part 261 Appendix 2, then the subject solid waste is classified as a RCRA Characteristic Hazardous Waste. The USEPA TCLP test, Method 1311, uses a dilute acetic acid either in de-ionized water (TCLP fluid 2) or in de-ionized water with a sodium hydroxide buffer (TCLP fluid 1). Both extract methods attempt to simulate the leachate character from a decomposing trash landfill in which the solid waste being tested for is assumed to be disposed in and thus subject to rainwater and decomposing organic matter leachate combination or an acetic acid leaching condition. Wastes containing TCLP leachable heavy metals are currently classified as hazardous waste due to the toxicity characteristic, if the level of TCLP analysis is above 0.2 to 100 milligrams per liter (mg/L) (or parts per million (ppm)) for specific heavy metals as defined under 40 C.F.R. part 261.24. The TCLP test is designed to simulate a worst-case leaching situation or specifically a leaching environment typically found in the interior of an actively degrading municipal landfill. Such landfills normally are slightly acidic with a pH of approximately 5±0.5. Similarly, the SPLP test replaces acetic acid with dilute sulfuric and dilute nitric acid to simulate acid rain. MEP operates by replacing the one 18-hour extract of TCPLP with ten sequential extracts, which measures the long-term usability and staying power of the stabilizer used to reduce heavy metal extraction ability.

Countries outside of the US, such as Taiwan, Philippines and Canada, also use the TCLP test as a measure of leaching. Thailand also limits solubility of Cu and Zn, as these are metals of concern to Thailand groundwater. Switzerland and Japan regulate management of solid wastes by measuring heavy metals and salts as tested by a sequential leaching method using carbonated water simulating rainwater and de-ionized water sequential testing. Additionally, USEPA land disposal restrictions prohibit the land disposal of solid waste leaching in excess of maximum allowable concentrations upon performance of the TCLP analysis. The land disposal regulations require that hazardous wastes are treated until the heavy metals do not leach at levels from the solid waste at levels above the maximum allowable concentrations prior to placement in a surface impoundment, waste pile, landfill or other land disposal unit as defined in 40 C.F.R. 260.10.

Suitable acetic acid leach tests include the USEPA SW-846 Manual described Toxicity Characteristic Leaching Procedure (TCLP) and Extraction Procedure Toxicity Test (EP Tox), which is used in all Canadian Provinces, except Quebec. Briefly, in a TCLP test, 100 grams of waste are tumbled with 2000 ml of dilute and buffered or non-buffered acetic acid for 18 hours and then filtered through a 0.75 micron filter prior to nitric acid digestion and final ICP analyses for total "soluble" metals. The extract solution is made up from 5.7 ml of glacial acetic acid and 64.3 ml of 1.0 normal sodium hydroxide up to 1000 ml dilution with reagent DI water.

Suitable deionized (DI) carbonated water leach tests include the Japanese leach test which tumbles 50 grams of composited waste sample in 500 ml of water for 6 hours held at pH 5.8 to 6.3, followed by centrifuge and 0.45 micron filtration prior to analyses. Another suitable distilled water $CO_2$ saturated method is the Swiss protocol using 100 grams of cemented waste at 1 $cm^3$ in two sequential water baths of 2000 ml. The concentration of lead and salts are measured for each bath and averaged together before comparison to the Swiss criteria.

Suitable citric acid leach tests include the California Waste Extraction Test (CALWET), which is described in Title 22, Section 66700, "Environmental Health" of the California Health & Safety Code. Briefly, in a WET test, 50 grams of waste are tumbled in a 1000 ml tumbler with 500 grams of sodium citrate solution for a period of 48 hours. The concentration of leached lead is then analyzed by Inductively-Coupled Plasma (ICP) after filtration of a 100 ml aliquot from the tumbler through a 45 micron glass bead filter.

Heavy metals stabilized by the methods of the present invention include arsenic, silver, barium, lead, cadmium, chromium, mercury, selenium, copper, zinc, antimony and combinations thereof. Such heavy metals often comprise from about 0.5% to about 40% by weight of the pain residue, alternately as low as about 20 ppm to as high as about 800,000 ppm of the paint residue.

Environmental regulations throughout the world, such as USEPA regulations written under Resource Conservation Recovery Act (RCRA) (available at epa.gov/rcraonline) and Comprehensive Environmental Response, Compensation, and Liability Act (CERCLA) mandate (U.S.C. Title 42), require heavy metal bearing waste, heavy metal bearing contaminated soils, and materials producers to manage such materials and wastes in a manner safe to the environment and to human health. In response to these regulations, environmental engineers and scientists have developed numerous means to control heavy metals, mostly through chemical applications which convert the solubility of the material and waste character to a less soluble form, such that the waste passes leach tests. This enables the wastes to be either reused on-site, or disposed at local landfills without necessitating expensive hazardous waste disposal landfills or regional Treatment Storage and Disposal Facilities (TSDF) designed to provide metals stabilization. Historically, the primary focus of scientists has been reducing solubility of heavy metals such as lead, cadmium, chromium, arsenic and mercury, as these were and continue to be the most significant mass of metal contamination in soils. Major lead sources, on the other hand, include materials such as paint residues, cleanup site wastes such as battery acids, and slag wastes from smelters and incinerators.

There exists a demand for improved and less costly control methods of heavy metals from paint residue removal and recovery projects that allows for stabilization of heavy metals in paint residue and spent blast media into non-hazardous waste or materials that are stable, environmental-safe, worker-safe, non-toxic, substrate compatible, and multi-media compatible, and suitable for blending with dry blasting media, semi-wet sponge blast media, and high pressure water paint blast systems. The subject method allows for stabilized paint residue and spent media production and handling either outside of or within the paint residue OSHA enclosure after residue removal from the structure and/or within devices used to collect residue from the OSHA container and before the discharge of the residues into accumulation containers.

In some aspects of the invention, the stabilizing agent is blended with blast media and applied to a painted substrate as a mixture during blast treatment of the substrate. Suitable blasting methods and instruments for use with the present invention include pressurized pot blasting, venturi blasting, and other methods of vacuum collection of stabilized blast media and lead paint mixture. The stabilizing agent used in the blasting methods described herein does not cause dusting or embedding in the substrate.

In alternate aspects of the invention, the stabilizing agent comprises beef bone meal and is used in other methods of on-site stabilization, including as a paint additive, as an in-tank dry stabilizer additive, or as an OSHA containment unit floor spreading stabilizer additive.

The subject pre-mixed, non-separating stabilizer and blast media method allows for stabilized paint residue and spent paint removal media production and handling either outside of or within the paint residue OSHA enclosure after residue removal from the structure and/or within devices used to collect residue from the OSHA container and before the discharge of the residues into accumulation containers.

The methods described herein are environmentally benign in that the methods reduce the solubility of the heavy metals contained in paint residue, and therefore diminish the amount of heavy metal that is leached into the environment during blast cleaning of a substrate or during disposal of paint waste. Similarly, the methods described herein are benign to human health, in that the stabilizing agents reduce the amount of heavy metal to which a worker is exposed during blasting. Further, beef bone meal, as described herein, does not generate dust. Blasting small particles causes significant dusting, which is not desirable for blasting contractors due to concern for worker safety, environmental safety, and compliance with state and local laws and ordinances.

In some embodiments of the invention, the methods described herein remove and stabilize heavy-metal bearing paint from a substrate and further prepare the substrate for subsequent proofing, coating or painting. Accordingly, the methods of the present invention do not cause visual embedding or residual adhesion of either the stabilizer or the blast media on the surface of the substrate.

The stabilizing agent for use in the present invention comprises beef bone meal. In some aspects of the invention, the beef bone meal is combined with complexers containing chlorides. Without being bound to theory, complexers containing chloride allow for formation of chloropyromorphite apatite mineral. Such a lead chloropyromorphite has a $K_{sp}$ in water of 10E-92 versus a $K_{sp}$ of 10E-20 for lead phosphate.

In further aspects of the invention, for projects in which the SSPC standard of non-embedment is not a criterion, or for which a less-strict non-embedment criterion is established, beef bone meal can be combined with inexpensive stabilizers such as phosphate rock and calcium phosphate sources such as monocalcium phosphate, single superphosphate, triple superphosphate, dicalcium phosphate, dicalcium phosphate dihydrate powder, monocalcium phosphate, and tricalcium phosphate for substitution of Pb into calcium phosphate apatite minerals. The additive can comprise up to 50% by weight of the blend of beef bone meal and additive.

In yet further aspects of the present invention, beef bone meal can be combined with an additive suitable for the stabilization of lead and other heavy metals, wherein the mixture of additive and beef bone meal meets the non-embedment project criterion established by the SSPC. Certain additives, such as about 16 to about 200 US Sieve, or alternately about 30 to about 100 US Sieve sized steamed pork bone meal, fishbone meal, phosphate rock, or calcium phosphate stabilizer additives, may be used in up to 50% by weight blend with the beef bone meal for TCLP reduction of lead concentration and still meet the non-embedment requirement. In some aspects of the invention, beef bone meal in 50% blend with phosphate rock or pork bone meal utilizing a venturi vacuum pickup method with a lower pressure blasting nozzle on a laboratory scale does not cause visual embedment of the substrate. Beef bone meal, pork bone meal, fishbone meal, phosphate rock and calcium phosphates have the unique capability to be applied as a dry powder, dry granular, or fine colloidal slurry mixture additive that will remain suspended in solution and convey uniformly with pressurized pots and media venturi pickup blast methods. This advantage is due to the minimal water solubility of bone and ore phosphates and calcium phosphates, which prevents these materials from exothermic curing in wetted media. Such exothermic curing occurs with wetting or semi-wetting of alternate technologies such as Blastox calcium silicates and calcium oxides, both of which are highly water soluble and highly hydroscopic and reactive. The most significant advantage with production of lead substituted bone and ore apatites and calcium phosphate minerals in paint residue is that the solubility constant, and hence leachability and bioavailability, are greatly reduced in this true apatite form at $K_{sp}$ 10 E-92, as compared to the simple lead-silicate and lead-oxide minerals forms at $K_{sp}$ values greater than 10E-5 from Blastox type amended solid media. Most preferably, the stabilizing agent is beef bone meal. Beef bone meal has a lower protein and moisture content than other bone meals such as pork or fish. Low protein and moisture content is particularly advantageous because bone meals having high moisture and protein content leave residue on the substrate, and thus may fail the SSPC industry requirement of non-embedment and non-attached media stabilizer prior to the subsequent application of paint.

In some aspects of the invention, the bone meal is from about 200 mesh to about ¼inch (0.635 cm) diameter size particle, and in some aspects of the invention, the bone meal is powder, granulated, or flake. In a preferred embodiment of the invention, the beef bone meal that is mixed with the blast media is in ¼inch (0.635 cm) flake shape. Without being bound by theory, the preferred ¼inch flake beef bone meal is particularly advantageous in that it shatters on impact with the substrate, opening more phosphate surface area for precipitation and ion exchange, which effectively stabilizes the heavy metals in the paint residue or the mixed paint residue and spent blast paint removal media. The dynamic velocity of the bone meal stabilizing agent is a result of pressurized air mixed with, for example, a pot source of blast media and stabilizer blend. Utilizing bone meal in blasting methods improves its TCLP control ability.

The shattering effect is advantageous because the bone meal remains intact until shattering on impact with the substrate. Thus, the methods of the present invention limit dusting at the blast nozzle and allow the bone fragment to remain low-sifting and low-settling with blast media in the blast pot container.

The beef bone meal used in the present invention is non-separating, i.e., the stabilizing agent remains integral within the blast media, which enables a uniform and steady-state dosage of the stabilizing agent per unit of blast media, a feature necessary for reliable in-line stabilization. Beef bone meal is advantageous in that it is pH-neutral, water-insoluble, grind-suitable, non-sifting, non-settling, safe to both environment and human worker, and an OSHA-DOT non-hazardous and non-regulated material. Beef bone meal is steamed and crushed natural beef bone material. In some embodiments, beef bone meal means steamed beef bone meal. Its hardness and brittle character allow it to be handled and blended with solid media without causing embedding upon blasting.

The form of beef bone meal, the dose rate and weight percent, and the composition of the blasting media can be selected and engineered for each blasting environment and each type of paint residue composition anticipated, such as lead, chromium, arsenic, copper, zinc or combinations thereof.

In typical stabilization technologies, the dosage of the stabilizer is very low, from 0.5% to 5% of the weight of blended blast media. Thus, it is very important that the stabilizer remain suspended within the solid blast media matrix, such that it is introduced into the blasted paint waste at a uniform and steady-state manner, allowing for uniform distribution of the stabilizer "seed" into the mixed media and residue. The weight percent of stabilizer used will be a stabilizer dose to waste ratio that has been determined by prior lab analyses as the minimum required to assure that the stabilized blend of residue and media meets non-hazardous waste criteria, for example, less than 5.0 ppm TCLP Pb in the US, Taiwan, Philippines and Canada. There is a need for a stabilizing agent that can be premixed with blast media for heavy-metal containing paint removal, wherein the stabilizing agent remains uniformly distributed in the media and does not cause separation of the mixture. Such a mixture would be useful for the production and handling of stabilized heavy metal-containing paint residue and spent paint removal media, and would be utilized either outside of or within a paint residue OSHA enclosure before the residues are discharged into accumulation containers.

In some aspects of the invention, the beef bone meal is pre-mixed with the blasting media. Methods by which the stabilizing agent and the blasting media are blended together include, but are not limited to ball mill, cone blending, tumbling, and slurry cycling. Typical blast media for use in the methods of the present invention include but are not limited to garnet, Green Diamond Sand that comprises mine tailing crushed rock, Black Beauty comprising coal slag, shell comprising natural ground shells of nuts and shellfish, sand, sponge, steel shot, rubber or high pressure water. In preferred embodiments of the invention, the stabilization agent is about 0.5 to about 5% by weight of the composition as mixed with the blasting media. In preferred embodiments the stabilization agent is about 1 to about 2% by weight of the composition. In more preferred embodiment of the invention, the mixture of stabilizing agent in blasting media is 2% beef bone meal in Green Diamond Sand.

When heavy metals in paint residue such as lead come into contact with the stabilizing agent and blended media with sufficient reaction time and energy, apatite minerals with low water solubility form, such as a Pb, Cr and As substituted hydroxyapatites, apatite $Pb_3(PO_4)_2$, and in the case of beef bone meal combined with complexers, chloropyromorphite. Through substitution or surface bonding, these minerals form at the point of media and stabilizer contact with painted surfaces, and these apatite minerals are less soluble than the heavy metal element or molecule originally in the paint residue. There exist several thousand possible mineral low-solubility combinations possibly formed given the paint residue composition and possible stabilizer additives identified. Certain combinations of beef bone meal and additives may provide for long-term stabilization and passage of leach tests beyond that regulated, and thus be more suited to paint residues intended for reuse or land application. The present invention provides a multitude of stabilizer options for the stabilization design engineer, which can be tested for final recipe solubility under the various leach tests of interest.

Although the beef bone meal is the preferred embodiment, examples of possible additive stabilizing and/or complexing agents include, but are not limited to, chlorides, iron, aluminum, ferric and ferrous sulfates, aluminum sulfate, flocculants, coagulants, nuclei particulates, ligands, cement kiln dust, lime kiln dust, sulfides, iron, silicates, phosphate feeds, phosphate fertilizers, phosphate rock, pulverized phosphate rock, calcium orthophosphates, trisodium phosphates, calcium oxide (quicklime), dolomitic quicklime, natural phosphates, phosphoric acids, dry process technical grade phosphoric acid, wet process green phosphoric acid, wet process amber phosphoric acid, black phosphoric acid, merchant grade phosphoric acid, aluminum finishing phosphoric and sulfuric acid solution, hypophosphoric acid, metaphosphoric acid, hexametaphosphate, tertrapotassium polyphosphate, polyphosphates, trisodium phosphates, pyrophosphoric acid, fishbone phosphate, animal bone phosphate, herring meal, bone meal, phosphorites, and combinations thereof. Salts of phosphoric acid can be used and are preferably alkali metal salts such as, but not limited to, trisodium phosphate, dicalcium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

The amounts of beef bone meal and optional additional agents and complexing additive combinations used, according to the method of invention, depend on various factors including desired solubility reduction potential. Such solubility may be determined to be, for example, less than 5.0 ppm or 0.75 ppm TCLP Pb as required under 40 CFR Part 261.24 or 40 CFR part 268 LDR disposal limitation for land disposed stabilized paint residue and media mixtures. In alternate aspects of the invention, the stabilizing agent and dosage is selected based upon desired mineral toxicity, for example less than 50% lethal dose when exposed to a batch aquatic toxicity test using fathead minnows under the Washington state Department of Ecology (WADOE) toxicity regulations. In yet another aspect of the invention, the stabilizing agent and dosage thereof is based upon desired mineral formation relating to toxicological and site environmental control objectives, for example lead pyromorphites, chloropyromorphite, corkite, or plumbogummite. The foregoing does not preclude higher or lower pre-blend dose of stabilizing agents or combinations of stabilizers and complexing agents.

The examples below are merely illustrative of this invention and are not intended to limit it thereby in any way.

EXAMPLES

Example 1

Figure 2:
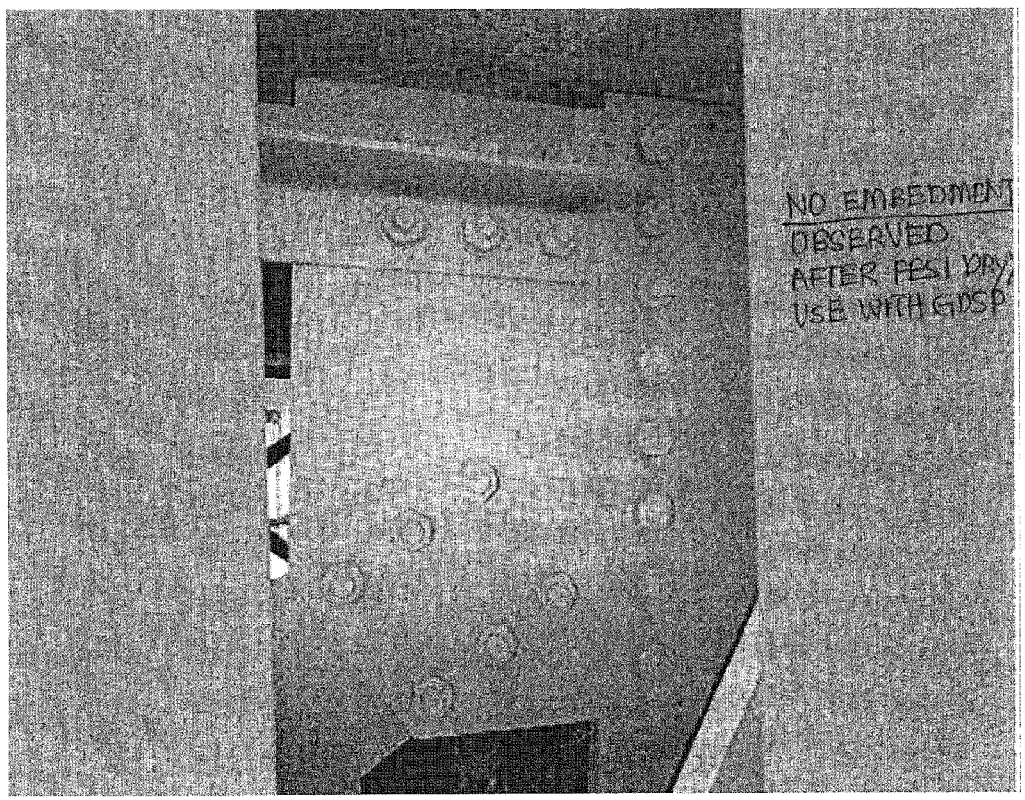
FIG. 2 is a photograph of a section of the Queets River Bridge. After removal of paint utilizing Green Diamond Sand Product blast media and beef bone meal as described in the present invention, no visible embedding was observed.

Green Diamond Sand Product (GDSP) blast media combined with 2% by weight steamed beef bone meal screened to less than ¼ inch diameter (FESI-BOND-X1) was utilized in paint removal from the Queets River Bridge. The reduction in lead in the paint residue after treatment with the amended blast media is significant and meets TCLP standards. FIGS. 1 and 2 are photographs from this series of tests that demonstrate no visual embedding at the Queets River Bridge.

| analyte | concentration in paint residue prior to blast treatment | unit | concentration in paint residue after treatment with FESI-BOND | unit |
|---|---|---|---|---|
| TCLP Arsenic | <0.05 | mg/L | <0.05 | mg/L |
| TCLP Barium | 0.381 | mg/L | 0.287 | mg/L |
| TCLP Cadmium | 0.020 | mg/L | 0.015 | mg/L |
| TCLP Chromium | 0.062 | mg/L | 0.063 | mg/L |
| TCLP Lead | 37.2 | mg/L | 0.50 | mg/L |
| TCLP Selenium | <0.08 | mg/L | <0.08 | mg/L |
| TCLP Silver | <0.007 | mg/L | <0.007 | mg/L |
| TCLP Mercury | <0.0002 | mg/L | <0.0002 | mg/L |

Figure 3:
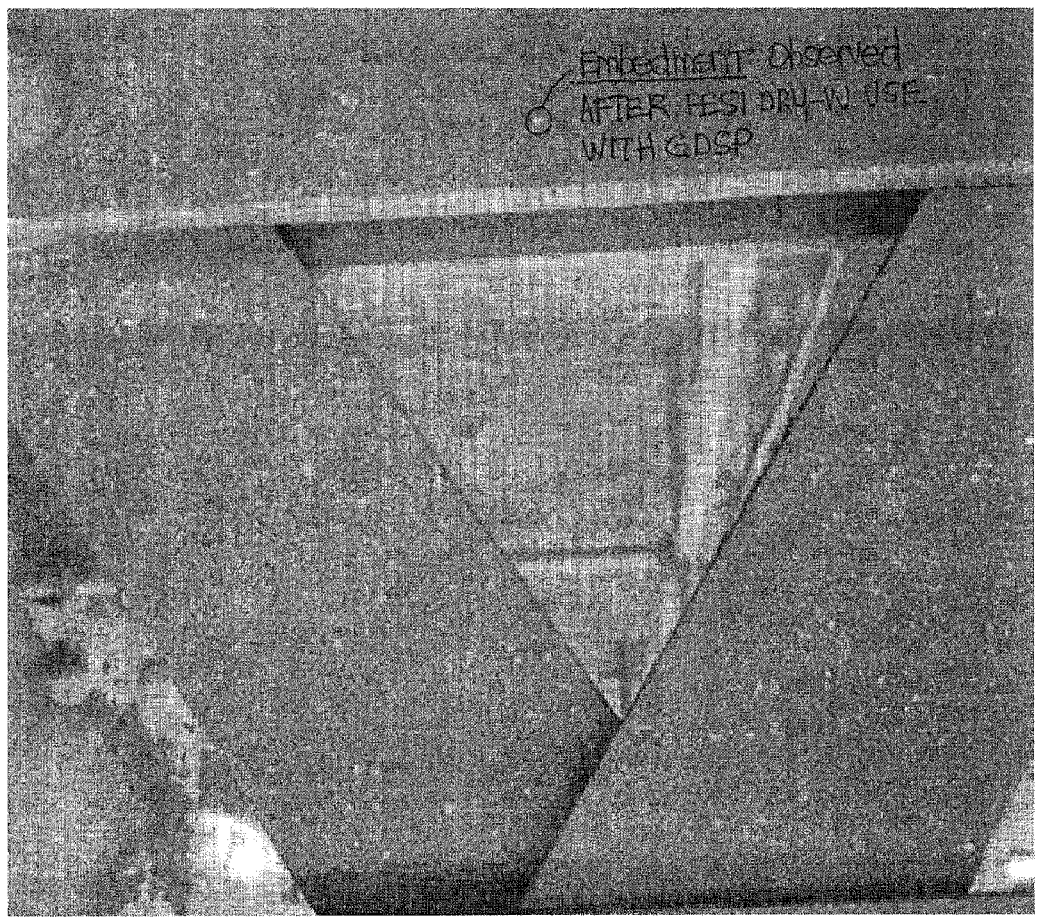
FIG. 3 is a photograph of a section of the Hood River Bridge. After removal of paint utilizing Green Diamond Sand Product blast media and Monodicalcium Phosphate (MDCP), visible embedding was observed, which appears as light-toned dots on the bridge surface.

Pilot tests using GDSP showed visual embedment, sifting, settling and dusting with Monodicalcium Phosphate (MDCP), tricalcium phosphate or monocalcium phosphate as triple superphosphate as stabilizing agent. FIG. 3 is a picture of the Hood River Bridge after blasting with Green Diamond Sand Product and MDCP blend (FESI Dry-W) and shows significant visual embedding in the substrate. Beef bone meal under analogous conditions demonstrated no visual embedding, no sifting, no settling, and no dusting.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A method for stabilizing a heavy metal in a heavy metal-containing paint residue to reduce leaching of the heavy metal therefrom when said paint residue is generated into paint waste and exposed to natural or induced leaching conditions, comprising:
    contacting a heavy metal-containing paint residue that is painted on a substrate with an integral mixture comprising paint removal blast media and a heavy metal stabilizing agent comprising steamed beef bone meal that is free-flowing, thereby forming a blast-cleaned surface and a waste mixture comprising heavy-metal stabilized paint waste, spent paint removal blast media and the stabilizing agent; wherein the stabilizing agent is present in an amount effective to reduce leaching of the heavy metal in the waste mixture to a non-hazardous level when the waste mixture is exposed to natural or induced leaching conditions;
    wherein the stabilizing agent and the paint removal blast media are not visually embedded or adhered to the blast-cleaned surface.

2. The method of claim 1, wherein the method is performed within an Occupational Safety and Health Administration (OSHA) containment structure.

3. The method of claim 1, wherein the method is performed within a collection device comprising an exhaust air filtration cyclone or baghouse.

4. The method of claim 3, wherein the method is performed prior to exposing the waste mixture to an exhaust air filtration cyclone or baghouse.

5. The method of claim 1, wherein the method is performed within a vacuum collection device after exposure of the waste mixture to an exhaust air filtration cyclone or baghouse and before the discharge of the waste mixture to an accumulation tank.

6. The method of claim 1, wherein the method is performed within a vacuum collection device after exposure of the waste mixture to an exhaust air filtration cyclone or baghouse and during the discharge of the waste mixture to an accumulation tank.

7. The method of claim 1, wherein the method is performed within a vacuum collection device during exposure of the waste mixture to an exhaust air filtration cyclone or baghouse.

8. The method of claim 1, wherein the stabilizing agent is used in pressurized blast pots or a venturi-type pickup apparatus.

9. The method of claim 1, wherein paint removal blast media is a dry blasting media, a semi-wet sponge blasting media or high pressure water.

10. The method of claim 1, wherein the stabilizing agent is in the form of a dry powder, a dry granule, or as a slurried mixture.

11. The method of claim 1, wherein the integral mixture comprising paint removal blast media and stabilizing agent comprises beef bone meal at 2% by weight in mining tailing crushed rock.

12. The method of claim 1, wherein the heavy metal stabilized paint waste comprises a heavy-metal containing solid phase mineral exhibiting low toxicity and low solubility under natural or induced leaching conditions.

13. The method of claim 12, wherein the solid phase mineral is $Pb_3(PO_4)_2$.

14. The method of claim 13, wherein the mineral has low solubility in water and simulated rainwater extract and meets the criteria for resistance to leaching under SPLP leaching test USEPA method 1310.

15. The method of claim 1, wherein the blast-cleaned substrate is compatible with subsequent application of at least one of paint surface cleaner, primer and paint.

16. The method of claim 1, wherein the stabilizing agent stabilizes heavy metals and reduces leaching of heavy metals in paint residue, spent paint removal blast media, the substrate, and residual airborne or deposited dust.

17. The method of claim 1, wherein the waste mixture does not classify as characteristic hazardous waste according to the Toxicity Characteristic Leaching Procedure, Test Method 1311.

18. The method of claim 1, wherein the mixture further comprises pork bone meal, fish bone meal, fishbone, phosphate rock, calcium phosphates, Portland Cement, cement kiln dust, lime kiln dust, lime, silicates, sulfides, iron, quicklime, phosphate complexers chlorides, iron and/or aluminum; wet process amber phosphoric acid, wet process green phosphoric acid, coproduct phosphoric acid solution from aluminum polishing, technical grade phosphoric acid, hexametaphosphate, polyphosphate, calcium orthophosphate, superphosphates, triple superphosphates, single superphosphate, ordinary superphosphates, crop production phosphates, phosphate feeds, phosphate fertilizers, tetrapotassium polyphosphate, monocalcium phosphate, monoammonia phosphate, diammonium phosphate, dicalcium phosphate, dicalcium phosphate dihydrate powder, tricalcium phosphate, trisodium phosphate, salts of phosphoric acid, or combinations thereof.

19. A method for stabilizing a heavy metal in a mixture comprising heavy metal-containing paint waste and spent paint removal blast media to reduce leaching of the heavy metal under natural or induced leaching conditions, comprising:
contacting a waste mixture comprising heavy metal-containing paint waste and spent paint removal blast media with a heavy metal stabilizing agent comprising steamed beef bone meal that is free-flowing, the steamed beef bone meal being present in an amount effective to reduce leaching of the heavy metal to a non-hazardous level under natural or induced leaching conditions, thereby forming a heavy metal stabilized waste comprising the heavy metal-containing paint residue, the stabilizing agent and the spent paint removal blast media.

20. A method of reducing the solubility of heavy metal in a waste mixture comprising heavy metal-containing paint waste and spent paint removal media and meeting the Society for Protective Coatings standard of no-visual embedding of stabilizing agent or blast media particles on a blast cleaned substrate, comprising:
contacting a heavy metal-containing paint residue that is painted on a substrate with an integral mixture comprising paint removal blast media and a heavy metal stabilizing agent comprising steamed beef bone meal that is free-flowing, thereby forming a blast-cleaned surface and a waste mixture comprising heavy-metal stabilized paint waste, spent paint removal blast media and the stabilizing agent; wherein the stabilizing agent is present in an amount effective to reduce leaching of the heavy metal in the waste mixture to a level no more than non-hazardous levels as determined in an EPA TCLP test, performed on the stabilized material or waste, as set forth in the Federal Register, vol. 55, no. 126, pp. 26985-26998 (Jun. 29, 1990) when the waste mixture is exposed to natural or induced leaching conditions;
wherein the shape and size of the steamed beef bone meal is selected to meet the Society for Protective Coatings standard of no-visual embedding of stabilizing agent or blast media particles on a blast cleaned substrate.

21. A method for stabilizing a heavy metal in a heavy metal-containing paint residue to reduce leaching of the heavy metal therefrom when said paint residue is generated into paint waste and exposed to natural or induced leaching conditions, comprising:
contacting a heavy metal-containing paint residue that is painted on a substrate with an integral mixture comprising paint removal blast media and a heavy metal stabilizing agent comprising about 16 to about 200 US sieve sized steamed beef bone meal that is free-flowing, thereby forming a blast-cleaned surface and a waste mixture comprising heavy-metal stabilized paint waste, spent paint removal blast media and the stabilizing agent; wherein the stabilizing agent is present in an amount effective to reduce leaching of the heavy metal in the waste mixture to a non-hazardous level when the waste mixture is exposed to natural or induced leaching conditions;
wherein the stabilizing agent and the paint removal blast media are not visibly embedded or adhered to the blast-cleaned surface.

* * * * *